United States Patent

[11] 3,602,263

[72] Inventor Raymond M. Bremner
 102 Lynedock Crescent, Don Mills,
 Ontario, Canada
[21] Appl. No. 773,084
[22] Filed Nov. 4, 1968
[45] Patented Aug. 31, 1971

[54] PIPE RELINING METHOD AND APPARATUS
 8 Claims, 15 Drawing Figs.
[52] U.S. Cl. ................................................. 138/97,
 138/141, 29/401
[51] Int. Cl. ............................................... F16l 55/18
[50] Field of Search........................................... 138/97,
 141; 61/45; 137/15; 29/474.4, 433, 401

[56] References Cited
 UNITED STATES PATENTS
 2,522,171  9/1950  Furman ........................ 138/97 V
 2,601,248  6/1952  Brenholdt ..................... 138/97 V
 3,123,101  3/1964  Blount .......................... 138/97
 3,149,646  9/1964  Xenis ............................ 138/97
 3,294,121  12/1966 Powell .......................... 138/97
 3,269,421  8/1966  Telford ......................... 138/97
 FOREIGN PATENTS
 1,100,490  4/1955  France ......................... 138/140

Primary Examiner—Herbert F. Ross
Attorney—Thomas Talmon Rieder

ABSTRACT: A sewer pipe is relined by reaming the old pipe to remove protrusions and obstructions and provide a relatively smooth interior surface; a liner of plastic material is inserted by pulling it along the pipe while vibrating the entire liner from the leading end. Openings are formed in the wall of the liner to provide for lateral connections and these openings are plugged while grout is injected between the inner surface of the existing pipe and the liner, the plugs being removed after the grout has set.

*INVENTOR.*
RAYMOND M. BREMNER

BY *Maybee & Legris*
ATTORNEYS

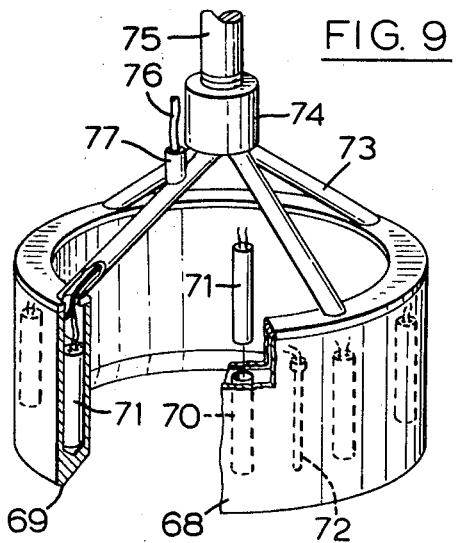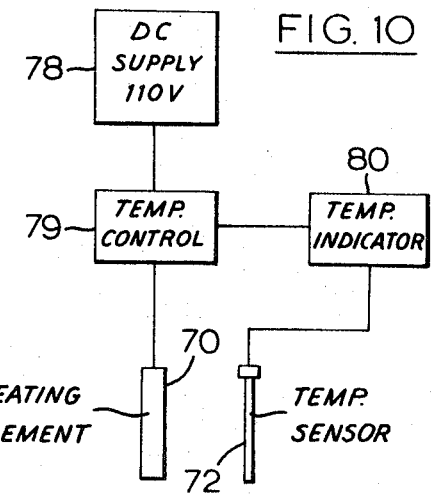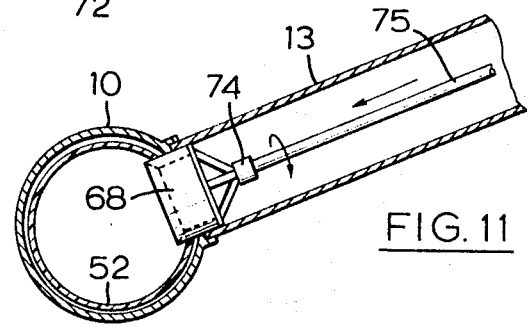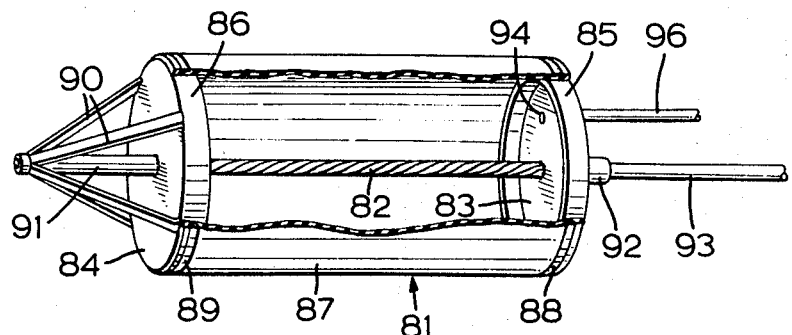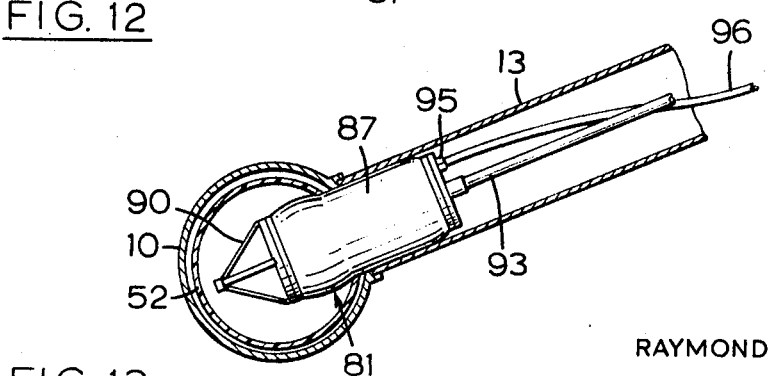
INVENTOR.
RAYMOND M. BREMNER
BY Maybee & Legris
ATTORNEYS

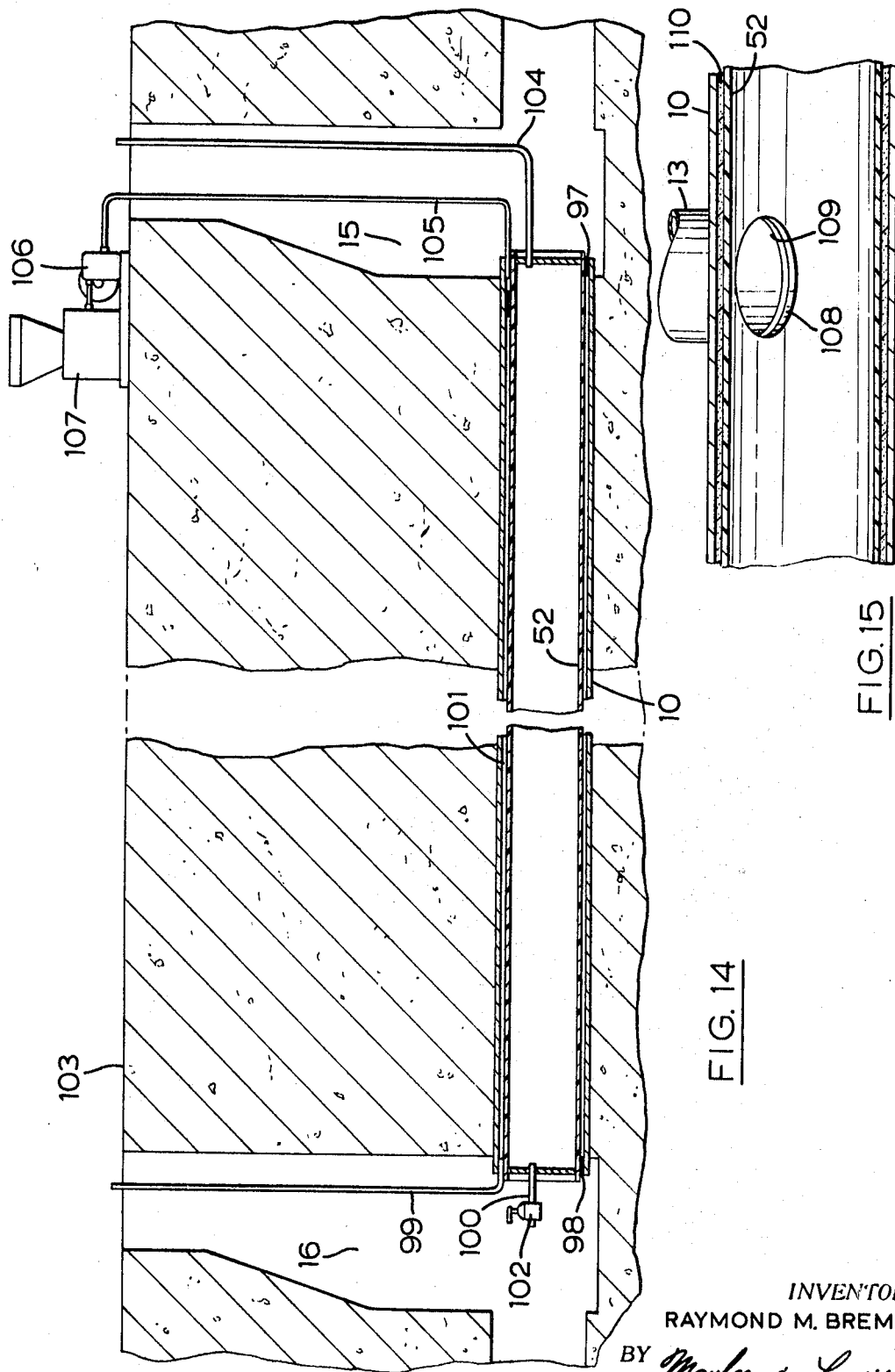

3,602,263

PIPE RELINING METHOD AND APPARATUS

BACKGROUND OF THE INVENTION

This invention relates to a process for relining pipes, especially sewer pipes in cities, municipalities, townships and villages and waste pipes used in chemical and industrial plants.

In the case of a sewer pipe, incrustation, protrusions and infiltration through joints and cracks inhibit the carrying capacity of the pipe. At the present time repairs cannot be carried out without a great deal of costly excavation and consequent disruption of the travelled portion of the surface because it is generally necessary to replace the whole of a damaged pipe section.

It is an object of the present invention to provide a method of relining existing pipes with a minimum amount of excavation and disruption to the travelled portion of the surface. Basically, this is achieved by reaming the existing pipe to remove any obstructions and protrusions, and inserting a flexible liner of plastic material. The internal diameter of the relined pipe is generally slightly smaller than that of the original pipe, but the smooth internal surface of the final liner actually improves the flow characteristics of the pipe.

SUMMARY OF THE INVENTION

According to the invention a process for relining a pipe comprises the steps of reaming the pipe to provide a substantially smooth obstruction free inner surface, providing a flexible tubular liner of plastic material having an external diameter slightly less than the internal diameter of the reamed pipe, and inserting the liner into the pipe. The liner is inserted by pulling it along the pipe while imparting vibratory forces to the liner through its leading end so as to jiggle it along the pipe.

In the case of a sewer pipe having one or more lateral connections, openings are formed in the liner in register with the lateral connections and the openings are plugged while grout is injected between the inner surface of the pipe and the liner, the plugs being subsequently removed.

Other features of the invention will become apparent from the description which follows, and the drawings referred to therein.

BRIEF DESCRIPTION OF THE DRAWINGS

One specific process in accordance with the invention, and apparatus therefor, will now be described by way of example with reference to the accompanying drawings, in which:

FIG. 9 is a perspective view, partly in section, of an electrically heated boring tool used in the process of the invention;

FIG. 10 is a schematic block diagram illustrating the control circuit for the boring tool;

FIG. 11 is a view showing the boring tool in use;

FIG. 12 is a perspective view, partly in section, of an inflatable plug used in the process of the invention;

FIG. 13 is a view showing the inflatable plug in use;

FIG. 14 is a longitudinal sectional view of the sewer pipe, the figure showing the pipe after it has been relined and ready for grouting; and FIG. 15 is a fragmentary sectional view of the sewer pipe after relining and grouting.

DESCRIPTION OF THE PREFERRED EMBODIMENT

The purpose of relining an existing sewer line is to revitalize the structural strength of the line and/or to improve the carrying capacity of an existing sewer by providing a liner free of protrusions, obstructions, incrustations and infiltration. Prior to undertaking the relining of the sewer it is necessary to carry out the following preparatory steps:

1. the sewer must be inspected by camera to determine the extent of deterioration, deviations from line and grade, and the presence of obstructions, protrusions and cracks.
2. obstructions and protrusions must be removed, and the sewer must be cleaned thoroughly to remove all accumulated debris;
3. the locations of all live drains must be determined;
4. access holes to each private drain must be excavated free from the travelled portion of the surface; and
5. an access shaft must be excavated at an appropriate distance, which may be 300 feet, say, from an existing manhole.

Figure 1:
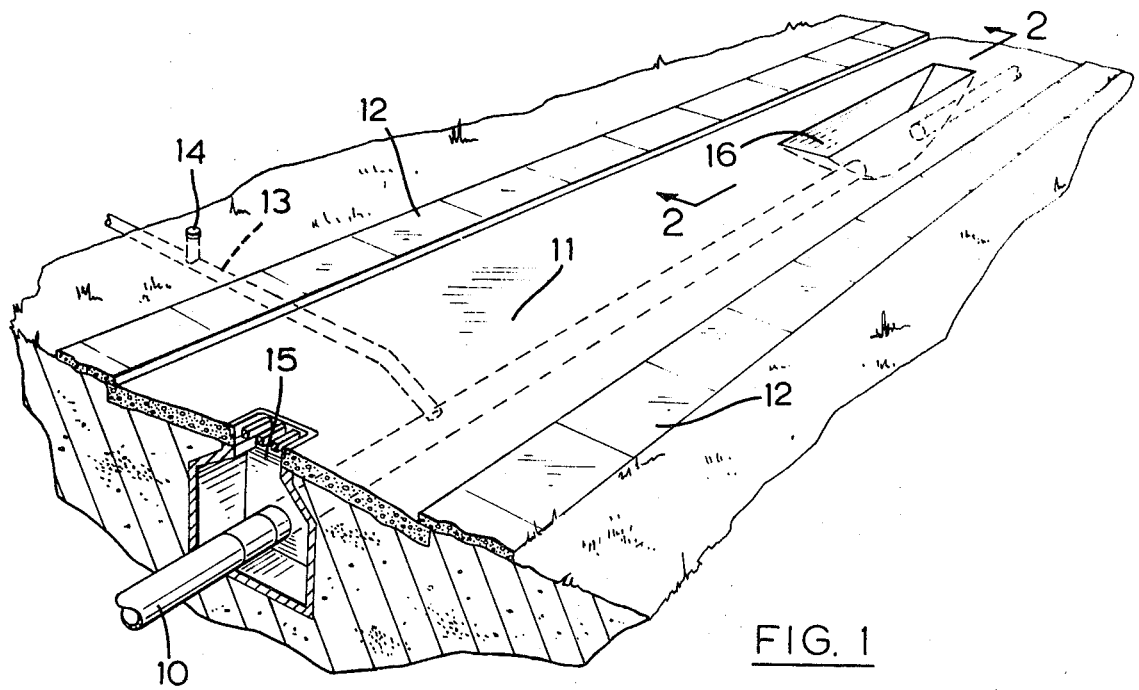
FIG. 1 is a fragmentary perspective view of a sewer pipe to be relined by the process of the invention.

Referring to FIG. 1, a sewer pipe 10 to be relined extends longitudinally beneath a road having a pavement 11 and sidewalks 12, which provide the travelled portion of the road surface. Lateral connections 13 to private drains are provided at intervals along the length of the sewer pipe, each private drain generally having a drain breather 14. Manholes such as 15 are provided at intervals along the length of the road to provide access to the sewer.

An access shaft 16 is excavated at a distance (more or less 300 feet) from the manhole 15, and an access shaft (not shown) is also excavated beyond the travelled portion of the surface for each private drain 13.

Before the main sewer pipe 10 can be relined it must be reamed to remove obstructions and protrusions. After a long period of use the inside of the pipe may be incrusted; the incrustations, together with protrusions of private drain connections into the pipe form obstructions, shown at 18 in FIG. 12, which effectively reduce the cross-sectional area of the pipe and materially impair its flow characteristics. The reaming operation is performed by means of a reaming tool 19, which is towed through the pipe 10 by means of a tow cable 20.

As illustrated in FIGS. 3 to 6, the reaming tool 19 for reaming the internal surface of the pipe comprises a cylindrical housing 21 and a reaming head 22. Within the housing 21 is mounted a compressed air motor 23, having a rotary drive shaft 24 arranged coaxially with the housing 21 and projecting from the forward end thereof. Compressed air for driving the motor 19 is supplied to the motor from an air compressor 25 (FIG. 2) through a hose 26 which extends through the rear end of the housing 21 and is connected to the motor 23. The reaming head 22 is a hollow body consisting of a circular plate 27 welded to an inwardly extending axial sleeve 28, a generally conical plate 29 having an outermost cylindrical surface portion 30 welded to the rim of the circular plate 27, and a swivel coupling 31 closing the forward end of the conical plate member 29, the swivel coupling 31 and the sleeve 28 being axially aligned. The reaming head is mounted on the rotary shaft 24 so as to be driven thereby, by coupling the sleeve 28 to the rotary shaft 24 and securing them together by bolts 32.

Figure 2:
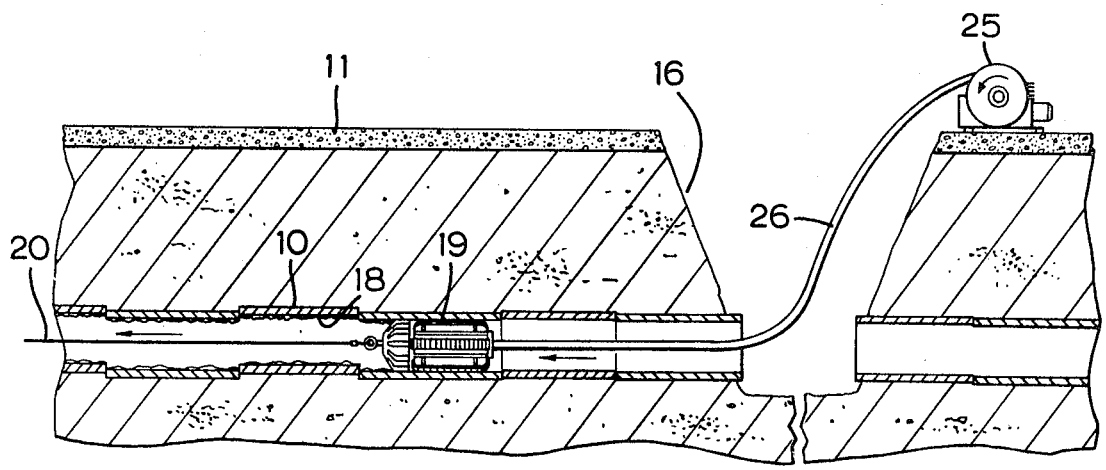
FIG. 2 is a longitudinal sectional view of the sewer pipe during the reaming operation.

Distributed around the reaming head 22 are twelve steel plates 33, the operative surfaces of which comprise particles of crushed carbide bonded on the steel with silver solder. The reaming head 22 is freely rotatable with respect to the swivel coupling 31, the latter being adapted for the connection of a tow cable 20 as shown in FIG. 2.

Figure 3:
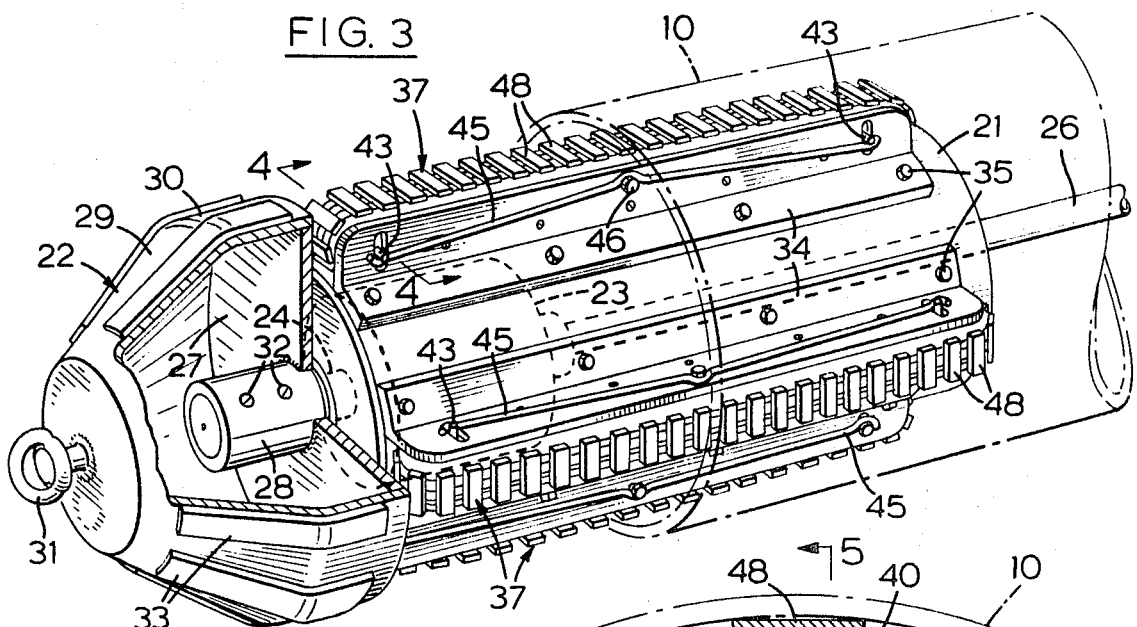
FIG. 3 is a perspective view, partly broken away, of a reaming tool for performing the reaming operation.
Figure 4:
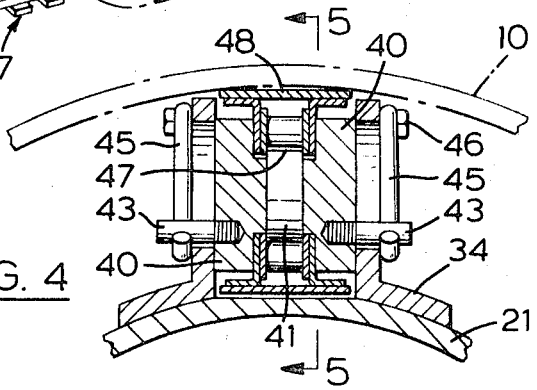
FIG. 4 is a section on line 4—4 in FIG. 3.
Figure 5:
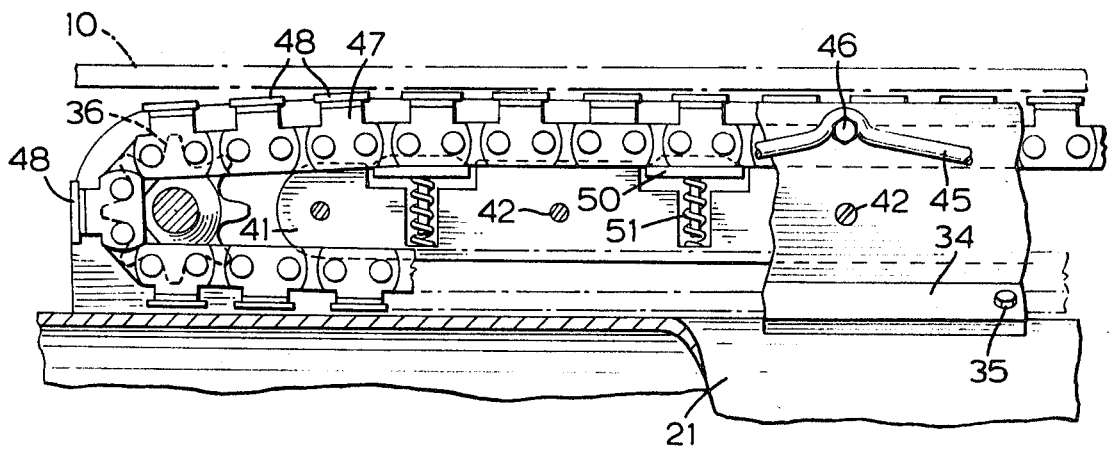
FIG. 5 is a section on line 5—5 in FIG. 4.
Figure 6:
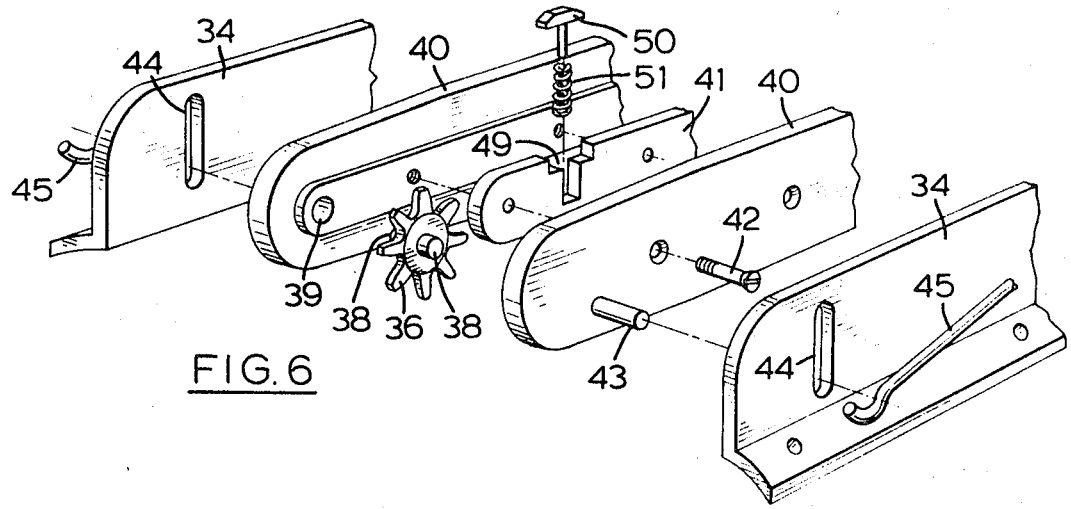
FIG. 6 is an enlarged, exploded perspective view on the detail shown in FIG. 4.

A plurality of circumferentially spaced idler assemblies are mounted externally of the housing 21. Each of said idler assemblies is mounted between a pair of longitudinally extending, radially projecting, flanged plates 34, which are bolted to the housing 21 by bolts 35. Each idler assembly comprises a pair of sprockets 36, which are longitudinally spaced with respect to the housing, and an endless track 37 carried by the sprockets. Each sprocket 36 has a pair of stud shafts 38 which are journaled in holes 39 provided on the inner surfaces of a pair of elongated guide plates 40, the latter being spaced apart by means of a spacer lock 41 to which they are bolted by bolts 42. Projecting from the outer surfaces of the guide plates 40, near each end thereof, are two pins 43, which engage in radially extending slots 44 in the radial flanges of the flanged plates 34. As best seen in FIGS. 3 and 4, the idler assemblies are biased radially outwardly by means of spring rods 45, which pass over bolts 46 projecting from the flanged plates 34 and engage underneath the projecting pins 43. Each endless track 37 comprises a flexible, endless chain 47 and a series of friction pads 48 carried by the chain. The friction pads 48 are of steel with crush carbide silver soldered to their outer surfaces. The chain 47 passes round the sprockets 36 in engagement with them, the sprockets being idler sprockets to permit relative movement between the endless tracks and the housing. The spacer blocks 41 are provided each with a series of longitudinally spaced recesses 49. The recesses 49 accommodate thrust pads 50 which engage the chain 47 and are resiliently biased by compression springs 51 to urge the endless tracks 37 radially outwardly into frictional engagement with the internal surface of the pipe 10. By providing a series of thrust pads 50 for each endless track, different portions of the track are urged into engagement with the pipe independently of one another, thus enabling the track to follow more readily variations in the pipe surface.

In operation of the reaming tool, compressed air is supplied to the motor 23 by way of the hose 26, and the tool is towed through the pipe by means of the tow cable 20. The reaming head 22 is rotated by the motor, so that the operative or cutting surfaces of the plates 33 ream the internal surface of the pipe 10 and remove protrusions and obstructions therefrom. The housing 21, which carries the motor 23 is prevented from rotating by the tracks 37 which engage the internal surface of the pipe frictionally, the tracks 37 providing a large area of contact with the surface of the pipe by virtue of the resilient biasing means which enable the tracks to follow variations in the surface contour.

Figure 8:
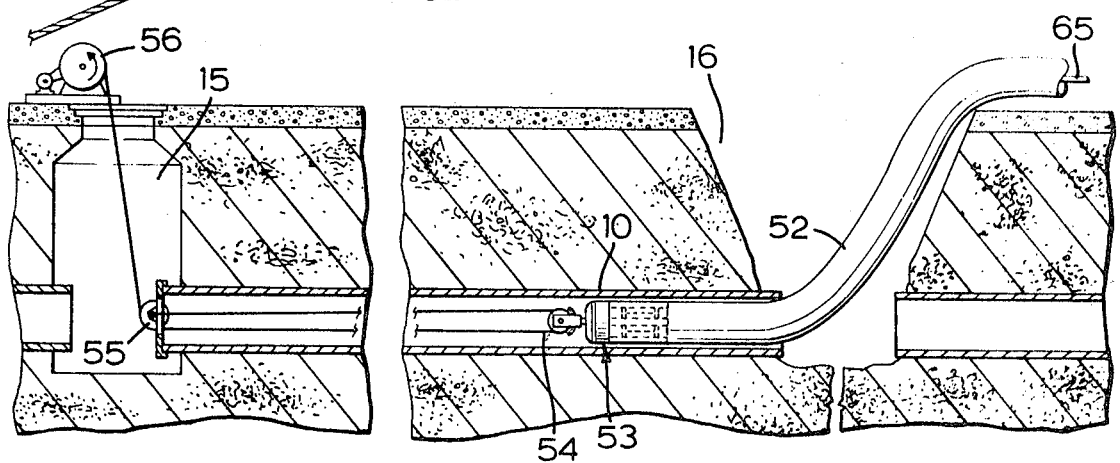
FIg. 8 is a longitudinal sectional view of the sewer pipe showing the vibratory nose cone in use.

After reaming of the sewer pipe 10, a flexible tubular liner 52 of tough thermoplastic material, such as high density polyethylene, is inserted into the pipe, the liner having an external diameter which is slightly less than the internal diameter of the pipe after reaming. Two to four lengths of tubular liner may be welded together on the site prior to insertion, depending on how much room is available at the site. As shown diagrammatically in FIG. 8, the tubular liner 52 is fed through the access shaft 16, the leading end of the tubular liner being secured to a vibratory nose cone 53. The nose cone 53 is pulled along the length of the pipe 10 by means of a cable 54 which passes round a pulley 55 and extends through the manhole 15. Traction is applied to the cable 54 by means of a winch 56.

Figure 7:
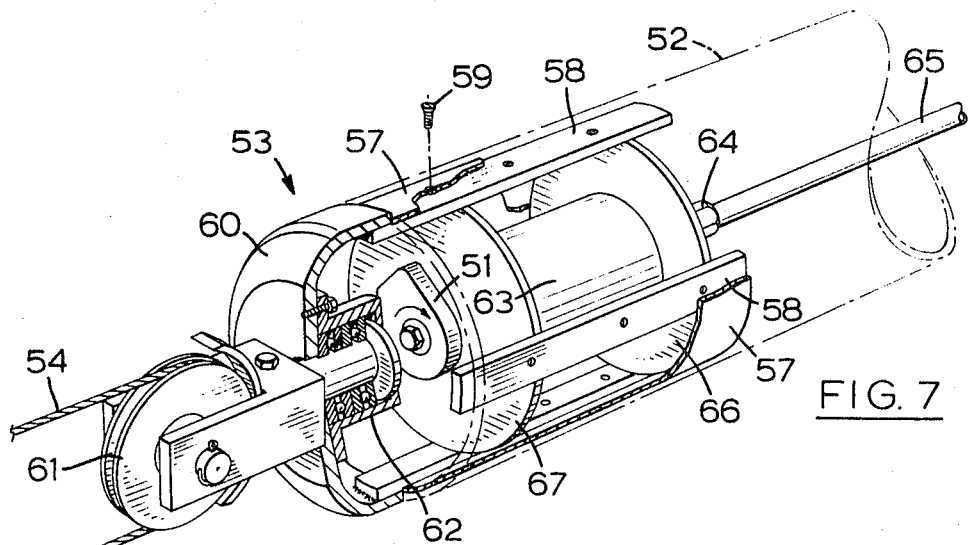
FIG. 7 is a perspective view, partly broken away, of a vibratory nose cone used in the process of the invention.

Referring to FIG. 7, the vibratory nose cone 53 comprises a steel cylinder 57 having four longitudinally extending ribs 58 to which the liner 52 is bolted by means of bolts 59. A blunt nose 60 is welded to the ribs 58 to close the front end of the cylinder. The cable 54 passes round a pulley 61, which is mounted by swiveling means 62 projecting forwardly from the nose 60 to permit the pulley to swivel freely. Within the cylinder 57 is an air motor 63 to which compressed air is supplied via an inlet 64, the compressed air being supplied from a compressor (not shown) through a hose 65 connected at one end to the inlet 64. The leading end of the tubular liner 52 is threaded over the ribs 58 and bolted to them as shown. The air motor 63 is mounted between end plates 66, 67, and is coupled to an eccentric rotor 51 which vibrates the assembly in known manner transversely to its axis as the air motor is driven. By vibrating the leading end of the tubular liner in this way as it is pulled through the pipe, it is possible to overcome resistance which could only be overcome otherwise by applying very great traction forces; these forces might be so high as to damage the liner and the existing sewer installation.

After the liner is installed, it is necessary to form openings in the liner to register with any lateral connections to private drains, such as 13. This is achieved by inserting a boring tool through the lateral connection to bring the tool into engagement with the outer surface of the liner. In principal, a rotating cutter of the trepan type could be used, but such tools are inclined to be unsatisfactory when the lateral connections have awkward bends.

A preferred construction of boring tool for forming the lateral openings is illustrated in FIGS. 9 and 11, and a control system for the tool is illustrated diagrammatically in FIG. 10. The tool comprises essentially an annular cylindrical block of copper, or like heat conductive material, 68 which is chamfered at its lower end to provide a narrow rim 69. A number of blind bores 70 extend from the upper end of the block 68 parallel to the axis of the block, and resistance heating elements 71 are located within these bores. Also located within one blind bore in the block is a temperature sensitive device 72, such as a thermistor. The block 68 is supported by a number of stainless steel support arms 73 whose upper ends are connected to a cylindrical boss 74 secured to one end of a flexible rod 75. Electrical leads to the resistance heating elements 70 and thermistor 72 pass through the rods 73, which are tubular, and are led out by way of an opening 77 as shown in FIG. 9. Alternatively, the rod 75 may be tubular and the leads may be taken through the tubular rods 73 and the tubular rod 75.

As shown in FIG. 10, the heating elements 70 are supplied from a DC generator 78 in accordance with the operation of a control circuit 79. The control circuit is operated by a temperature indicating device 80 connected to the thermistor 72. In use, the boring tool is inserted through the lateral connection until the rim 69 comes into contact with the thermoplastic tubular liner 52. Current is then supplied to the heating elements 70, to heat the block 68, and at a predetermined temperature indicated by the temperature indicator 80 the current to the heating element is cut off by the control device 79. This temperature is such that the tool can readily fuse its way through the thermoplastic material of the liner, but is well below the flash point of the material and of any decomposition products that may be formed by the fusion. FIG. 11 diagrammatically illustrates the tool in use.

The next step in the relining process is to inject grout between the inner surface of the pipe and the outer surface of the tubular liner; the grout is injected from within the manhole 15 as indicated diagrammatically in FIG. 14. Before injecting the grout it is necessary to plug or seal the newly formed openings in the plastic liner, and for this purpose inflatable plugs 81 (FIGS. 12 and 13) are used.

Referring to FIGS. 12 and 13, an inflatable plug according to the invention comprises a half-inch diameter steel cable 82 extending between circular end plates 83 and 84. The end plate are formed with short axially extending flanges, 85 and 86, respectively, to which the ends of a cylindrical rubber sleeve 87 are secured by stainless steel bands 88, 89. The leading end of the plug is formed as a nose for guiding purposes, the nose consisting of a number of guide arms 90 distributed around a central pipe 91 and welded at their ends to the pipe 70 and the end plate 84, respectively. At the rear end of the plug 81 is a coupling member 92 welded to the end plate 83. The coupling member 92 is formed as a boss having a screw threaded axial recess for connection to the screw-threaded end of a carrying rod 93. The end plate 83 is also formed with an aperture 94 into which a hose adapter 95 is fitted so as to connect an air hose 96.

The normal external diameter of the plug 81 is, of course, less than the diameter of the opening to be plugged. In order to use the plug, one end of the rod 93 is connected to the coupling 92 and the hose 96 leading from a compressed air supply is connected to the adapter 95. The rod 93 is lowered through the lateral connection, from the access shaft of the private drain, until the plug is positioned in the newly formed opening of the tubular liner. Compressed air is applied through the hose to expand the rubber sleeve 87 into sealing engagement with the edges of the opening. Other openings in the length of the relined pipe are plugged in a similar way. FIG. 13 shows the plug after it has been inserted into the pipe to close a lateral opening. With the plugs in place, the grout is injected between the inner surface of the pipe 10 and the tubular liner 52, and is permitted to set, the plugs subsequently being deflated and removed from the openings.

The arrangement for injecting the grout is illustrated in FIG. 14; the lateral openings and plugs are omitted from this figure for simplicity. As shown in FIG. 14, the ends of the sewer pipe 10 at access shafts 15 and 16 are sealed by packing, 97, 98. Two 1-inch diameter vent pipes 99, 100, are installed through the packing 98 at the bottom end of the access shaft 16, the vent pipes projecting into the annular space 101 between the liner 52 and the pipe 10. One vent pipe, 100, is equipped with a valve 102, and the other vent pipe 99 is led to the surface or ground level 103. A 1-inch diameter vent pipe 104 extends from the top of the access shaft 15 into the annular space 101, and in addition a 1-inch diameter grout feed pipe 105 is connected between the annular space 101 and a pump 106 which delivers grout from a grout mixer 107. The grout mix, consisting of one bag of cement to five gallons of water, is then pumped into the annular space 101 through the feed pipe 105.

A visual inspection is made at the lower access shaft 16 to ensure that there is a flow of grout from the valve 102; when this flow appears the valve 102 is closed and pumping is continued until an overflow appears at both of the vent pipes 99, 104, at ground level. The normal pumping pressure for the grout is of the order of 2 pounds per square inch, and a pressure of 5 pounds per square inch is considered to be the maximum. Upon completion of the grouting operation, the vent pipes and the inflatable plugs are left in position until the grout is set, the setting time depending upon temperature and humidity conditions and averaging about 8 hours.

A section of the relined sewer, after removal of the plugs 81, is shown in FIG. 15. The relined sewer essentially comprises the pipe 10, which constitutes a main conduit, the pipe having side openings providing lateral connections to the private drains 13, a flexible tubular liner 52 of tough plastic material lining the inner surface of the pipe, the liner having openings such as 108 registering with the side openings 109 in the pipe 10, and a filling of grout 110 between the inner surface of the pipe and the outer surface of the tubular liner.

When a sewer pipe has been relined in this way, the internal diameter of the pipe is slightly less than the original diameter, but because of the nature of the inner surface of the liner the flow characteristics of the pipe are substantially improved.

Although the invention has been described with particular reference to the relining of sewer pipes, it will be appreciated that it is applicable to the relining of other fluid pipes whose inner surfaces are liable to deteriorate through constant usage.

What I claim as my invention is:

1. A process for relining a pipe, which comprises:
  a. reaming the pipe to provide a substantially smooth obstruction and protrusion free inner surface,
  b. providing a flexible tubular liner of plastic material, the liner having an external diameter which is slightly less than the internal diameter of the pipe,
  c. and inserting the liner into the pipe by pulling it along the pipe while simultaneously vibrating the leading end of the liner in a plane transverse to the axis of the liner.

2. A process according to claim 1, characterized by the further step of injecting grout between the inner surface of the pipe and the liner.

3. A process according to claim 1, in which the tubular liner is of high density polyethylene.

4. A process for relining a sewer pipe having one or more lateral connections, which process comprises:
  a. reaming the pipe to provide a substantially smooth obstruction and protrusion free inner surface;
  b. providing a flexible tubular liner of plastic material, the liner having an external diameter which is slightly less than the internal diameter of the pipe;
  c. inserting the liner into the pipe by pulling it along the pipe while simultaneously vibrating the leading end of the liner in a plane transverse to the axis of the liner;
  d. providing openings in the liner in register with the lateral connections;
  e. inserting plugs into said openings;
  f. injecting grout between the inner surface of the pipe and the liner, the grout being retained therebetween by the plugs;
  g. permitting the grout to solidify and removing the plugs from said openings.

5. A process according to claim 4, wherein the liner is of high density polyethylene.

6. A process for relining a sewer pipe having one or more lateral connections, which process comprises:
  a. reaming the pipe to provide a substantially smooth obstruction and protrusion free inner surface;
  b. providing a flexible tubular liner of thermoplastic material, the liner having an external diameter which is slightly less than the internal diameter of the pipe;
  c. inserting the liner into the pipe by pulling it along the pipe while simultaneously vibrating the leading end of the liner in a plane transverse to the axis of the liner;
  providing openings in the liner in register with the lateral connections by fusing through the thermoplastic material of the liner;
  e. inserting plugs into said openings;
  f. injecting grout between the inner surface of the pipe and the liner, the grout being retained therebetween by the plugs;
  g. permitting the grout to solidify and removing the plugs from said openings.

7. A process for relining a sewer pipe having one or more lateral connections, which process comprises:
  a. reaming the pipe to provide a substantially smooth obstruction and protrusion free inner surface;
  b. providing a flexible tubular liner of plastic material, the liner having an external diameter which is slightly less than the internal diameter of the pipe;
  c. inserting the liner into the pipe by pulling it along the pipe while simultaneously vibrating the leading end of the liner in a plane transverse to the axis of the liner;
  d. providing openings in the liner in register with the lateral connections;
  e. inserting plugs into said openings, said plugs being inflatable members whose dimensions are such that when the members are collapsed they may be inserted into said openings via the lateral connections, and when the members are expanded they fill the openings;
  f. inflating said inflatable members to fill said openings;
  g. injecting grout between the inner surface of the pipe and the liner, the grout being retained therebetween by the plugs;
  h. permitting the grout to solidify;
  i. deflating said inflatable members and removing them from said openings.

8. A process for relining a pipe having a side opening providing a lateral connection, which process comprises:
  a. reaming the pipe to provide a substantially smooth obstruction and protrusion free inner surface;
  b. providing a flexible tubular liner of tough thermoplastic material, the liner having an external diameter slightly less than the internal diameter of the pipe;
  c. inserting the liner into the pipe by pulling it through the pipe while imparting vibratory forces to its leading end;
  d. forming an opening in the liner in register with said side opening by applying a heated element through said opening to fuse through the thermoplastic material, and
  e. sealing the edges of said registering openings.